Patented Sept. 25, 1934

1,974,481

UNITED STATES PATENT OFFICE

1,974,481

PROCESS FOR OBTAINING A FINELY DIVIDED CARBONACEOUS PRODUCT

George Antonoff, Croissy sur Seine, and Jean Freedland, Paris, France

No Drawing. Application October 15, 1930, Serial No. 489,006. In Great Britain October 23, 1929

14 Claims. (Cl. 252—3)

The present invention relates to a process for obtaining a carboniferous product in the state of extremely fine division.

This process consists in starting with a carbonaceous substance, in subjecting this substance to a treatment suitable for bringing it, at least partially, to a state of extremely fine division, and in incorporating with this substance in this state a body in the middle of which it can be dried or carbonized without danger of agglomeration. This body is so selected as to be easily capable of elimination, for example by evaporation or by dissolving out, in order to obtain after carbonization a product composed solely of finely divided carbon.

By way of example, the following methods of operation based upon this principle may be employed:—

(1) Wood, reeds or the like, divided into shavings which may be long but must be fine, is or are taken and treated with sulphuric acid of a concentration which varies from 1 to 2 per cent in the case of wood up to about 10 per cent in the case of reeds. This sulphuric treatment is effected in an autoclave under a pressure of 4 to 6 atmospheres; it continues for about half an hour. The mass of shavings becomes soft, the incrusting bodies having undergone a conversion. It is then washed in order to eliminate the sulphuric acid.

A portion of the mass is already capable of entering into colloidal solution and can therefore be utilized for being converted into carbon in the very finely divided state as will be hereafter described. But since the larger portion of the substance remains non-peptizable in these conditions, it is convenient to subject it to the following treatment. In order to render the mass wholly peptizable in an alkaline liquor, it is caused to undergo an oxidizing treatment. It is treated for example with nitric acid or aqua regia concentrated or diluted with water up to 50 per cent. The nitric acid can be recovered in order to be used again for a new treatment. There is produced an energetic exothermic reaction and the mass assumes a reddish tint. When the reaction is complete, the mass peptizes wholly in ammonia. The colloidal solution thus obtained can be filtered in order to free it from insoluble impurities. This can also be done by settling. It is then made to coagulate by means of an acid.

In order to render the coagulum capable of filtration, it is heated with its mother-liquor in an autoclave, under 4 to 6 atmospheres for example, for a time which varies from half an hour to two hours according to the dimensions of the autoclave. The coagulum can thereafter be separated rapidly by filtration from the greater part of the water.

If it is desired to have a very pure product, the filtered coagulum can be treated with 5 per cent hydrofluoric acid, for example, with which it is boiled for a time which may extend up to three hours.

The coagulum can be again peptized by the aid of a small quantity of ammonia in order to give a fairly concentrated pseudo solution.

In order that we may be able to dry the coagulant and carbonize it without its particles becoming agglomerated, it is incorporated in another body capable of coating or encasing the particles and of preventing their agglomeration, while being capable also of being easily eliminated. The drying may be effected in sulphur which can be afterwards removed by evaporation. There may also be employed dehydrating acids, for example, sulphuric acid, which however possesses the inconvenience of volatilizing at too low a temperature to permit a complete carbonization of the mass. Phosphoric acid is preferable, because it exercises the same dehydrating action but can endure very high temperatures without volatilizing. The product can be carbonized completely while remaining very finely divided and the phosphoric acid can be removed by simple washing.

The oxidizing treatment of the mass of carbonized shavings as indicated above can also be effected by utilizing gaseous chloride. The reaction is produced energetically with evolution of heat, if the chlorine is well distributed in the mass to be treated. If not, its action is limited to the surface. During this reaction, there is formed hydrochloric acid which it is necessary to eliminate, for example, periodically by means of water, after which the treatment with chlorine is resumed.

The operation can be carried out in a vessel comprising a filtering surface upon which the mass of semi-carbonized shavings is laid. This filtering surface allows the chlorine to pass as well as the water intended for the elimination of the hydrochloric acid in the form of a solution which can be collected as a by-product. The reddish oxidized mass obtained is more or less identical with that which results from the nitric treatment.

(2) Lignite or brown coal after having been dried, if necessary, is ground and then sifted. It is then oxidized by means of nitric acid in a manner already described; according to another modification, it is mixed with moistened quartz, the grains of which have a diameter, for example, of 4 to 5 millimetres, in the proportion of 1 kilogramme of air-dried brown coal to 12 kilogrammes of quartz. This mixture is placed in a closed chamber into which a current of chlorine is passed for a sufficient time for the carboniferous mass to become completely peptizable in ammonia.

The brown coal which has become red is separated by decantation or upon a sieve. The mass in suspension in the water is filtered.

The filtered product contains about 15 per cent of chlorine which can be removed by lime; the latter is eliminated in its turn by an acid washing.

Another method consists in adding ammonia in such a manner as to neutralize the mass under heat. The ammonium chloride $NH_4Cl$ which is formed prevents peptization; it is removed by filtration and can be treated by lime to recuperate the ammonia which can thus be utilized several times.

The product so neutralized and freed from ammonium chloride is peptized by ammonia. Peptization takes place with heating and with stirring or agitation; it takes 2 to 3 hours.

The peptized mass can be filtered or subjected to a settling operation to separate out the impurities and whatever has not been peptized, but experiment has shown that in the majority of cases this operation is not at all necessary.

The peptized mass is afterwards coagulated by means of an acid, HCl or $H_2SO_4$ for example. It is preferable to work with heat in an autoclave under a pressure of 4 to 6 atmospheres, in order that the mass may become properly filterable. The ammoniacal salts are separated by filtration. Washing is effected preferably with hydrochloric acid under heat.

After having determined the content in dry material by test upon a small portion, the coagulated mass is mixed with phosphoric acid, preferably in the proportion of 1 kilogramme of dry material to 10.5 to 11.5 kilogrammes of phosphoric acid $H_3PO_4$. The mixture is first submitted to a temperature sufficient to evaporate the water. The mass swells up and it is then subjected to a temperature of 400 to 500° C. during 2–3 hours. After cooling, the mass is diluted in water, and is washed and dried. The dried product is, if necessary, subjected to a disintegration process in order to remove the agglomerations which may have occurred, and is then screened or sifted. It may be advantageous to subject it to a temperature of 800 to 900° C.

By carbonizing the product in $H_3PO_4$ at 530° C. and by afterwards heating the final product to 900° C., a carbon has been obtained of apparent density $\Delta=0.078$ and of real density $\delta=2.225$.

Assuming that the ratio $\Delta/\delta$ expresses the fineness of the product, $\Delta/\delta=0.034$ in the case considered, while for carbon black the same ratio is 0.062, which tends to prove that the product obtained is extremely fine.

Similarly, tests upon the opacity (obscuring power) of the product obtained have shown that this power is also twice as great as that of carbon black. Thus it may be considered that the opacity increases with the degree of fineness.

The phosphoric acid employed to prevent agglomeration during the drying and the heating to 400–500° C. can be recuperated to a proportion of 98 per cent by known methods.

(3) When the mass is more completely carbonized than in the preceding cases, if it is a question, for example, of wood charcoal, the same result is not so easily obtained; nitric acid, even concentrated, produces no effect. However, the reaction sought can be produced all the same, provided that certain conditions are observed. For example if the nitric acid treatment is preceded by an alkali treatment, the nitric acid can attack the carbon with formation of a colloid having the same characteristics as that which is obtained in the preceding cases. If the acid attacks only a part of the mass, the alkaline treatment is repeated a larger number of times, according to the primary material used, and finally the whole of the material is successfully converted into colloid. Agitation assists the operation.

(4) The oxidation can also be effected electrolytically. Having regard to the fact that nascent chlorine is particularly satisfactory as an oxidant, the operation can be carried out in an electrolytic vat fitted with a diaphragm containing as electrolyte sodium chloride or another chloride. The mass which is to be oxidized is placed in the anode compartment where the chlorine is evolved. For eliminating the hydrochloric acid formed during the reaction and interfering with it, use may be made of the alkali formed in the cathode compartment, for example by transfusing it from time to time into the anode compartment.

As shown by the above described examples, the primary carbonaceous substance is first subjected to a treatment capable of transforming it, at least partially, into a product peptizable in an alkaline medium and coagulable by an acid.

In order to obtain a dry product in finely divided condition, when starting from the colloidal product, recourse is had to means which consist in principle in incorporating the said colloidal product while it is moist with another body in the middle of which it can be dried without danger of agglomeration. The foreign body is then eliminated either by evaporation or by solution or by any other suitable devices according to its nature. It is sometimes useful to add a protective colloid such as ammonium oleate for example.

In the preceding examples, the use of phosphoric acid has been recommended for this purpose, which body allows the heating of the mass to be effected at high temperature without it volatilizing. The operation can also be carried out as follows:—

For example, the moist colloid is mixed with flowers of sulphur and dried at 105° C. preferably in vacuo. The sulphur is then dissolved in carbon disulphide and the pure product is obtained in the dry and finely divided state.

The moist colloid can also be incorporated with anhydrous sodium carbonate which becomes hydrated so that the mixture forms a practically dry powder which can easily be ground in a mortar.

This powder is heated to 300–500° C. and after solution of the sodium carbonate, the carbon is obtained in a state of very fine division. Sodium chloride gives equivalent results.

In the case of sodium carbonate, the process can be substantially simplified.

The oxidized mass, after having been sufficiently moistened, is mixed with sodium carbonate, which peptizes the mass in situ. The addition of further quantities of sodium carbonate turns it into a thick paste, which liquefies on heating and becomes homogeneous. Sometimes small quantities of caustic alkalies can be added with advantage at the beginning, to help peptization and to dissolve silica. To obtain a fine product, there can be used, for example, 5 kilos of Na₂CO₃ to 1 kilo of carbon obtained. The mixture is first evaporated to dryness and then carbonized at about 500° C. The sodium carbonate is then dissolved in water and can be used again for further treatment.

According to another modification, chloride of calcium can be used with advantage as a medium for drying and carbonizing the mass.

In this case, the coagulated product can be mixed with it, or else the oxidized product is first peptized with a small quantity of ammonia and then mixed with chloride of calcium. In the latter case, the product will contain more silica. The brown coal, oxidized by nitric acid, is already freed from all soluble matter and contains substantially only silica. As the best kinds of brown coal contain only 2 to 3% of ash and a small percentage of silica, the above described treatment may be sufficient for any practical purposes. The product obtained must be free from soluble matter, but the presence of silica is of slight importance in the most cases. If the brown coal contained some sand or similar impurities, the process as described can be followed by a treatment in a cyclone separator, to remove the above named impurities.

According to another modification, there can be used, in a similar manner, other forms of solubilized carbonaceous materials. For example, by using sugars, or carbonaceous material transformed into lower sugars by one of the known methods, and treating them in the same way as hereabove described, there can be obtained very good results.

The product obtained can be utilized in particular in all applications where carbon black is employed, more especially in the india rubber industry.

In the claims hereafter, the expression "chemical treatment" comprehends also any kind of dissolution.

What we claim is:

1. A method of producing a carbonaceous product in a state of extremely fine division, which comprises, oxidizing a raw carbonaceous material by means of nitric acid, peptizing the material thus treated by means of ammonia, coagulating the colloidal solution thus obtained by means of an acid, mixing the coagulum with sodium carbonate so as to prevent agglomeration of the particles of said coagulum upon heating thereof, carbonizing said mixture and separating said body.

2. A method of producing a carbonaceous product in a state of extremely fine division, which comprises, oxidizing a raw carbonaceous material by means of chlorine so as to make it peptizable, peptizing the material thus treated by means of ammonia, coagulating the colloidal solution thus obtained by means of an acid, mixing the coagulum with sodium carbonate so as to prevent agglomeration of the particles of said coagulum together upon heating thereof, carbonizing said mixture and separating said sodium carbonate.

3. A method of producing a carbonaceous product in the state of an extremely fine powder which comprises, treating a raw carbonaceous material substantially free from sulphites by an alkali so as to peptize it, mechanically separating the peptized material from matters not peptized, mixing the colloidal solution thus obtained with a salt of an alkaline metal having a basic reaction, and drying the resulting product by heating.

4. A method of producing a carbonaceous product in the state of an extremely fine powder which comprises, treating a raw carbonaceous material substantially free from sulphites by an alkali so as to peptize it, mechanically separating the peptized material from matters not peptized, coagulating the colloidal solution thus obtained, mixing the coagulum with a salt of an alkaline metal having a basic reaction, and drying the resulting product by heating.

5. A method of producing a carbonaceous product in the state of an extremely fine powder which comprises, treating a raw carbonaceous material substantially free from sulphites by an alkali so as to peptize it, mechanically separating the peptized material from matters not peptized, mixing the colloidal solution thus obtained with sodium carbonate, and drying the resulting product by heating.

6. A method of producing a carbonaceous product in the state of an extremely fine powder which comprises, treating a raw carbonaceous material substantially free from sulphites by an alkali so as to peptize it, mechanically separating the peptized material from matters not peptized, coagulating the colloidal solution thus obtained, mixing the coagulum with sodium carbonate, and drying the resulting product by heating.

7. A method of producing a carbonaceous product in the state of an extremely fine powder which comprises, treating a raw carbonaceous material substantially free from sulphites by an alkali so as to peptize it, mechanically separating the peptized material from matters not peptized, mixing the colloidal solution thus obtained with a salt of an alkaline metal having a basic reaction, and heating the resulting product at a temperature not exceeding 600° C.

8. A method of producing a carbonaceous product in the state of an extremely fine powder which comprises, treating a raw carbonaceous material substantially free from sulphites by an alkali so as to peptize it, mechanically separating the peptized material from matters not peptized, coagulating the colloidal solution thus obtained, mixing the coagulum with a salt of an alkaline metal having a basic reaction, and heating the resulting product at a temperature not exceeding 600° C.

9. A method of producing a carbonaceous product in the state of an extremely fine powder which comprises, treating a raw carbonaceous material substantially free from sulphites by an alkali so as to peptize it, mechanically separating the peptized material from matters not peptized, mixing the colloidal solution thus obtained with sodium carbonate, and heating the resulting product at a temperature not exceeding 600° C.

10. A method of producing a carbonaceous product in the state of an extremely fine powder which comprises, treating a raw carbonaceous material substantially free from sulphites by an alkali so as to peptize it, mechanically separating the peptized material from matters not peptized, coagulating the colloidal solution thus obtained, mixing the coagulum with sodium carbonate, and heating the resulting product at a temperature not exceeding 600° C.

11. A method of producing a carbonaceous product in the state of an extremely fine powder which comprises, treating a raw carbonaceous humic material substantially free from sulphites by an alkali so as to peptize it, mechanically separating the peptized material from matters not peptized, mixing the colloidal solution thus obtained with a salt of an alkaline metal having a basic reaction, and drying the resulting product by heating.

12. A method of producing a carbonaceous product in the state of an extremely fine powder which comprises, treating a raw carbonaceous humic material substantially free from sulphites by an alkali so as to peptize it, mechanically separating the peptized material from matters not peptized, coagulating the colloidal solution thus obtained, mixing the coagulum with a salt of an alkaline metal having a basic reaction, and drying the resulting product by heating.

13. A method of producing a carbonaceous product in the state of an extremely fine powder which comprises, treating a raw carbonaceous humic material substantially free from sulphites by an alkali so as to peptize it, mechanically separating the peptized material from matters not peptized, mixing the colloidal solution thus obtained with sodium carbonate, and drying the resulting product by heating.

14. A method of producing a carbonaceous product in the state of an extremely fine powder which comprises, treating a raw carbonaceous humic material substantially free from sulphites by an alkali so as to peptize it, mechanically separating the peptized material from matters not peptized, coagulating the colloidal solution thus obtained, mixing the coagulum with sodium carbonate, and drying the resulting product by heating.

GEORGE ANTONOFF.
JEAN FREEDLAND.